United States Patent
Kim et al.

(10) Patent No.: US 6,633,665 B1
(45) Date of Patent: Oct. 14, 2003

(54) TRANSFORMATION METHOD OF THREE-DIMENSIONAL OBJECT POINTS ONTO TWO-DIMENSIONAL IMAGE POINTS FOR LINEAR PUSHBROOM IMAGES

(75) Inventors: Tae Jung Kim, Taejun (KR); Dong Seok Shin, Taejun (KR); Tag Gon Kim, Taejun (KR)

(73) Assignee: Korea Advanced Institute of Science and Technology, Taejun (KR)

( * ) Notice: Subject to any disclaimer, the term of this patent is extended or adjusted under 35 U.S.C. 154(b) by 476 days.

(21) Appl. No.: 09/649,652

(22) Filed: Aug. 29, 2000

(30) Foreign Application Priority Data

Aug. 16, 2000 (KR) ........................................ 2000-47224

(51) Int. Cl.$^7$ ................................................ G06K 9/00
(52) U.S. Cl. ...................................................... 382/154
(58) Field of Search ................................ 382/103, 154, 382/285, 293; 345/418, 419; 356/12

(56) References Cited

U.S. PATENT DOCUMENTS 6,028,606 A * 2/2000 Kolb et al. ................. 345/419
6,556,195 B1 * 4/2003 Totsuka et al. ............. 345/419

\* cited by examiner

*Primary Examiner*—Samir Ahmed
*Assistant Examiner*—Vikkram Bali
(74) *Attorney, Agent, or Firm*—Akin Gump Strauss Hauer & Feld, L.L.P.

(57) ABSTRACT

This invention provides a method to transform 3D object points onto 2D image points for linear pushbroom images. The problem is decomposed to the problem of finding sensor line coordinates and the problem of finding sensor column coordinates from linear pushbroom collinearity equations. The procedures to solve the problem are as follows. First, assume an initial value for image line coordinate to be sought for and using this value, calculate the sensor attitude. Next, assume the sensor attitude is constant and calculate a new image line coordinate satisfying linear pushbroom collinearity equations. Next, update the initial value with the image line coordinate calculated and continue the procedures until the difference between an initial value and a new value calculated becomes smaller than a threshold. If the different between an initial value and calculated value is smaller than a threshold, accept the calculated value as the sensor line coordinate. After finding the sensor line coordinate, calculate the sensor column coordinate satisfying linear pushbroom collinearity equations.

4 Claims, 3 Drawing Sheets

TRANSFORMATION METHOD OF THREE-DIMENSIONAL OBJECT POINTS ONTO TWO-DIMENSIONAL IMAGE POINTS FOR LINEAR PUSHBROOM IMAGES

TECHNICAL FIELD

The present invention relates to a method for transforming a 3D object point into a 2D image point using linear pushbroom sensors, more particularly to the transformation method for rectification of linear pushbroom images so that the images can be geometrically referenced and for generation of 3D geometric information from linear pushbroom images.

Herein, the terms '2D' and '3D' mean '2-dimensional' and '3-dimensional', respectively, unless otherwise specified

BACKGROUND OF THE INVENTION

Linear pushbroom images are the images taken by sensors in motion during imaging and which have a focal point per line or per part according to sensors' scanning mechanism. The sensors taking images in the manner are referred to as linear pushbroom sensors. Herein, the term 'sensor' means 'linear pushbroom sensor' unless otherwise specified. In comparison with linear pushbroom images, perspective images are the images that have a single focal point per image.

For perspective images, the problem of mapping 3D object point onto 2-dimentional image point is well developed and being widely used. For linear pushbroom images, however, a robust numerical solution for the problem has not been discovered.

A previously proposed solution for the problem is based on the Newton-Raphson method. However, the Newton-Raphson method works only within the region where the equation to be solved varies monotonically and hence it is very sensitive to the initial value. In some cases, this method ends up to diverse or create large errors. Although this method may work in others, it is not so easy to choose appropriate initial values. Therefore, the solution cannot be applied to rectification or generation of 3D information of linear pushbroom images.

SUMMARY OF THE INVENTION

In order to eliminate the difficulties of previous approaches, this invention proposes a new powerful and robust method to transform a 3D object point onto a 2D image point for linear pushbroom images.

In order to achieve the goal, this invention proposes a method for transforming an object point in a 3D coordinate system into an image point on a linear pushbroom image captured by a linear pushbroom sensor and represented in a 2D coordinate system. The method comprises steps for: setting collinearity equations in relation with the object point and the image point for the linear pushbroom image; assuming an initial coordinate on a first coordinate axis in the 2D coordinate system and calculating the attitude of the linear pushbroom sensor using the initial coordinate; obtaining a temporary coordinate by solving the collinearity equation, while assuming that the linear pushbroom sensor keeps a constant attitude as calculated; calculating a differential between the initial coordinate and the temporary coordinate; comparing the differential with a given threshold; repeating the attitude calculation step through the differential comparison step after considering the temporary coordinate as the initial coordinate if the differential exceeds the given threshold; deciding on the temporary coordinate to be a final coordinate on the first coordinate axis if the differential does not exceed the given threshold; and obtaining a coordinate on a second coordinate axis in the 2D coordinate system by solving the collinearity equations using the final coordinate on the first coordinate axis.

Preferably, the collinearity equations are set on, as follows;

$$0 = -f\frac{r_{11}(X - X_S) + r_{21}(Y - Y_S) + r_{31}(Z - Z_S)}{r_{13}(X - X_S) + r_{23}(Y - Y_S) + r_{33}(Z - Z_S)}$$

$$y = -f\frac{r_{12}(X - X_S) + r_{22}(Y - Y_S) + r_{32}(Z - Z_S)}{r_{13}(X - X_S) + r_{23}(Y - Y_S) + r_{33}(Z - Z_S)}$$

in which, X, Y and Z mean a coordinate of an object point, respectively; $X_S$, $Y_S$ and $Z_S$ mean a coordinate of the sensor upon capturing an image of the object, respectively; $r_{11}$ through $r_{33}$ mean an element of a rotation matrix R determined by the sensor attitude upon capturing an image of the object, respectively; $f$ means the focal length of the camera; and x and y mean a coordinate of an image point, respectively.

It is also preferred that the temporary coordinate obtainment step comprises sub-steps for: calculating elements of the rotation matrix R using the attitude of the linear pushbroom sensor; and solving the collinearity equation using the elements of the rotation matrix R.

According to the present invention, there is also provided a machine-readable medium on which a program is recorded, wherein the program conducts to transform an object point in a 3D coordinate system into an image point on a linear pushbroom image captured by a linear pushbroom sensor and represented in a 2D coordinate system by taking steps for: setting collinearity equations in relation with the object point and the image point for the linear pushbroom image; assuming an initial coordinate on a first coordinate axis in the 2D coordinate system and calculating the attitude of the linear pushbroom sensor using the initial coordinate; obtaining a temporary coordinate by solving the collinearity equation, while assuming that the linear pushbroom sensor keeps a constant attitude as calculated; calculating a differential between the initial coordinate and the temporary coordinate; comparing the differential with a given threshold; repeating the attitude calculation step through the differential comparison step after considering the temporary coordinate as the initial coordinate if the differential exceeds the given threshold; deciding on the temporary coordinate to be a final coordinate on the first coordinate axis if the differential does not exceed the given threshold; and obtaining a coordinate on a second coordinate axis in the 2D coordinate system by solving the collinearity equations using the final coordinate on the first coordinate axis.

BRIEF DESCRIPTION OF THE DRAWINGS

The above object, features and advantages of the present invention will be more clearly understood from the following detailed description taken in conjunction with the accompanying drawings, in which.

DETAILED DESCRIPTION OF THE INVENTION

Figure 1:
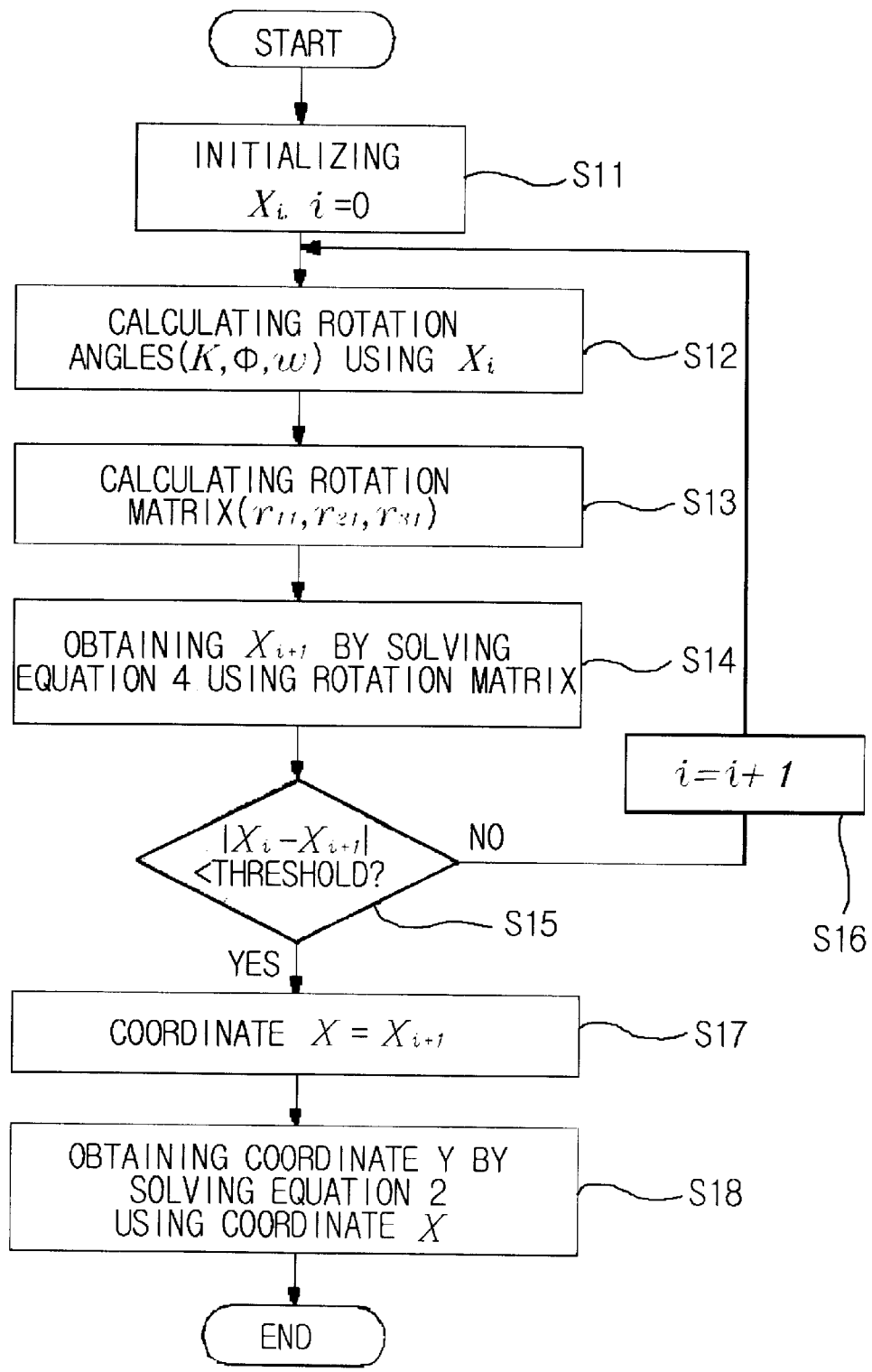
FIG. 1 shows a flow chart for illustrating the method for transforming an object point into an image point on a linear pushbroom image captured by a linear pushbroom sensor according to a preferred embodiment of the present invention.

Hereinafter, provided is a detailed description of the method for transforming an object point into an image point on a linear pushbroom image captured by a linear pushbroom sensor according to a preferred embodiment of the present invention. It is required to use a mathematical model to a 2D linear pushbroom image coordinate system and a 3D object coordinate system. This model is often called as sensor models. Although there are many sensor models proposed so far, the present invention is described using one sensor model based on the collinearity equations expressed in Equations 1 and 2 given below. However, the present invention is not limited to use only the equations given below. This invention works with any collinearity-based sensor models for linear pushbroom images, whose mathematical expression may vary from the equations given below.

$$0 = -f \frac{r_{11}(X - X_S) + r_{21}(Y - Y_S) + r_{31}(Z - Z_S)}{r_{13}(X - X_S) + r_{23}(Y - Y_S) + r_{33}(Z - Z_S)} \quad (1)$$

$$y = -f \frac{r_{12}(X - X_S) + r_{22}(Y - Y_S) + r_{32}(Z - Z_S)}{r_{13}(X - X_S) + r_{23}(Y - Y_S) + r_{33}(Z - Z_S)} \quad (2)$$

in which, X, Y and Z mean a coordinate of an object point, respectively; $X_S$, $Y_S$ and $Z_S$ mean a coordinate of the sensor upon capturing an image of the object, respectively; $r_{11}$ through $r_{33}$ mean an element of a rotation matrix R determined by the sensor attitude upon capturing an image of the object, respectively; $f$ means the focal length of the camera; and x and y mean a coordinate of an image point, respectively.

The rotation matrix R is to rotate the image coordinate system to be aligned with an object reference coordinate system and is represented by Equation 3.

$$R = \begin{pmatrix} \cos\phi \cos\kappa & -\cos\phi \sin\kappa & \sin\phi \\ \sin\omega \sin\phi \cos\kappa + \cos\omega \sin\kappa & -\sin\omega \sin\phi \sin\kappa + \cos\omega \cos\kappa & -\sin\omega \cos\phi \\ -\cos\omega \sin\phi \cos\kappa + \sin\omega \sin\kappa & -\cos\omega \sin\phi \sin\kappa + \sin\omega \cos\kappa & \cos\omega \sin\phi \end{pmatrix} \quad (3)$$

In Equation 3, κ, φ and ω mean a rotation angle to make the image coordinate system to be aligned with the reference coordinate system in Z, Y and X-axis, respectively.

Linear pushbroom images have one focal point per line or part and each line or part may have different sensor attitude. Therefore, the position of the sensor ($X_S$, $Y_S$, $Z_S$) and the rotation angles κ, φ and ω are represented by linear or non-linear polynomials for a coordinate x on a coordinate axis in the direction of the sensor motion from the image coordinate system according to the scanning mechanism.

According to the algorithm of the present invention, it is possible to calculate an image coordinate (x, y) in a 2D coordinate system for a given object coordinate (X, Y, Z) in a 3D coordinate system in a linear pushbroom image using collinearity-based linear pushbroom sensor model where the sensor position and attitude are represented by linear or non-linear polynomials.

The procedure of finding the image coordinate (x, y) for the given object coordinate (X, Y, Z) in linear pushbroom images is divided into two steps: one of them for finding a coordinate x on a first coordinate axis from the image coordinate system in Equation 4 derived from Equation 1; and the other of them for finding a coordinate y on a second coordinate axis from the image coordinate system in Equation 2 using the coordinate x on the first coordinate axis.

$$0 = r_{11}(X - X_S) + r_{21}(Y - Y_S) + r_{31}(Z - Z_S) \quad (4)$$

In Equation 4, the sensor position $X_S$, $Y_S$ and $Z_S$ are represented by linear or non-linear polynomials of the coordinate x on the first coordinate axis according to the scanning mechanism, and $r_{11}$, $r_{21}$ and $r_{31}$ are the combination of sine and cosine functions of the sensor attitude, i.e. rotation angles κ, φ and ω, which are represented by linear or non-linear function of the coordinate x on the first coordinate axis. Therefore, Equation 4 is a non-linear equation of the coordinate x on the first coordinate axis.

The previous method to solve Equation 4 finds the coordinate x on the first coordinate axis using Newton-Raphson method by assuming an initial value for the coordinate x on the first coordinate axis. However, it is well known that the Newton-Raphson method works only within the region where the equation to be solved varies monotonically and hence this method is very sensitive to the initial value. It is difficult to find monotonic regions of Equation 4 in advance and to choose an initial value of the coordinate x on the first coordinate axis to lie within such regions.

The present invention proposes an access, in which the coordinate x on the first coordinate axis is found by solving Equation 4 with the following new procedures.

Firstly, an initial value $x_0$ of the coordinate x on the first coordinate axis is assumed at a step S11 shown in FIG. 1, the sensor's rotation angles κ, φ and ω are calculated using the initial value $x_0$ at the next step S12, and then the rotation matrix ($r_{11}$, $r_{21}$, $r_{31}$) is calculated using the sensor's rotation angles κ, φ and ω at the next step S13.

Preparing that the rotation matrix ($r_{11}$, $r_{21}$, $r_{31}$) is constant, that is, the sensor attitude is not varied, Equation 4 can be simplified by linear or non-linear equation of x according to the sensor platform ($X_S$, $Y_S$, $Z_S$).

By solving this simplified equation of the coordinate x on the first coordinate axis, a temporary coordinate $x_1$ on the first coordinate axis is newly obtained at the next step S14.

Next, a differential between the initial value $x_0$ and the temporary coordinate $x_1$ is calculated. After comparing the differential with a given threshold at the next step S15, the temporary coordinate $x_1$ should be decided as a final coordinate on the first coordinate axis at the next step S17, if the differential does not exceed the given threshold. However, the steps S12 through S15 should be repeated if the differential exceeds the given threshold, while replacing the initial value $x_0$ with the temporary coordinate $x_1$ at the next step S17. This repeat is continued until the differential does not exceed the given threshold.

Finally, a coordinate y on the a second coordinate axis in the perpendicular direction of the sensor motion from the image coordinate system is obtained by solving Equation 2 using the final coordinate on the first coordinate axis, which is calculated from the previous steps at the next step S18.

More detailed explanation about the flowchart shown in FIG. 1 will be made. Firstly, the iteration number i is set on zero and an initial value is assigned to $x_i$ at the step S11. Next, using $x_i$, the sensor attitude, i.e. the rotation angles κ, φ and ω are calculated at the step S12 and parameters of the rotation matrix ($r_{11}$, $r_{21}$, $r_{31}$) are calculated at the step S13. Then, assuming that the rotation matrix ($r_{11}$, $r_{21}$, $r_{31}$) is constant, Equation 4 is solved to obtain $x_{i+1}$ at the step S14 and the differential between $x_i$ and $x_{i+1}$ is compared with a given threshold at the step S15. If the differential exceeds the given threshold, the iteration number i is increased by 1 at the step S16 and the aforementioned steps are repeated from the step S12. If the differential does not exceed the given threshold, $x_{i+1}$ obtained at the step S14 in the current period is accepted as the solution for the coordinate x on the first coordinate axis, which satisfies Equation 4. Once the solution for the coordinate x on the first coordinate axis is obtained, the coordinate y on the second coordinate axis is calculated using Equation 2 at the step S18.

Figure 2:
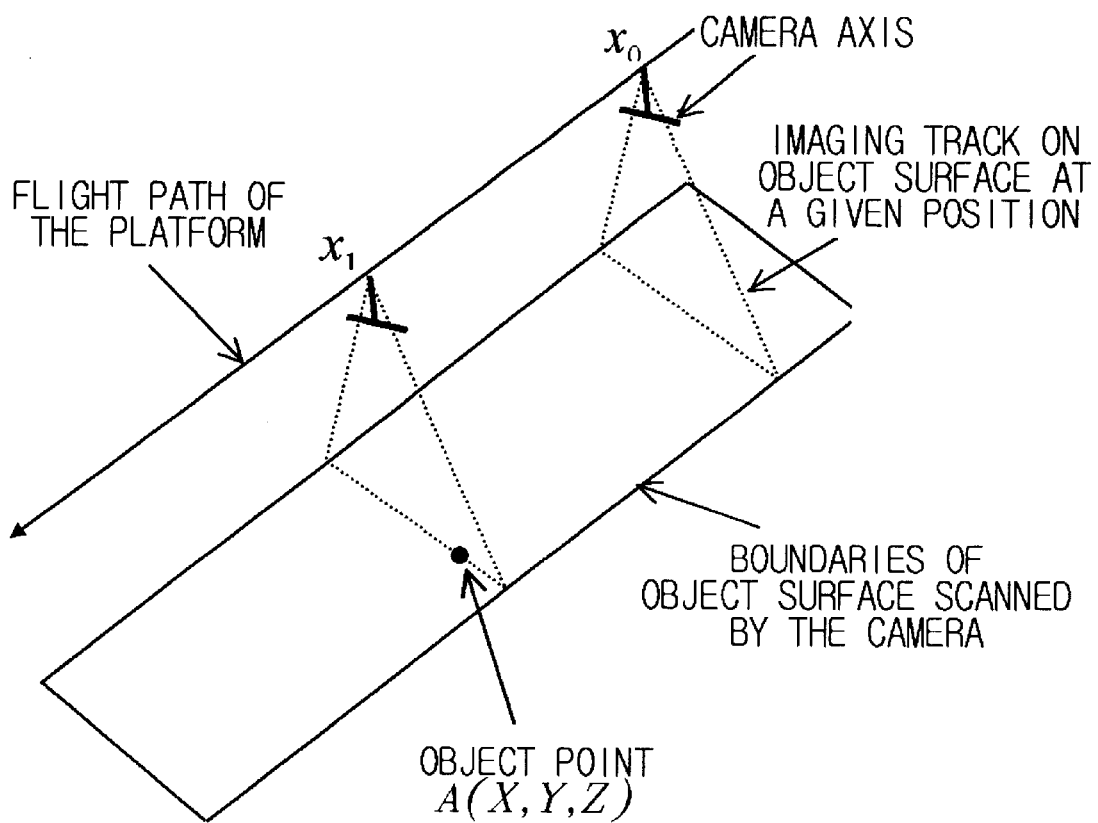
FIG. 2 and FIG. 3 show a diagram for illustrating an operation theory of the present invention, respectively.
Figure 3:
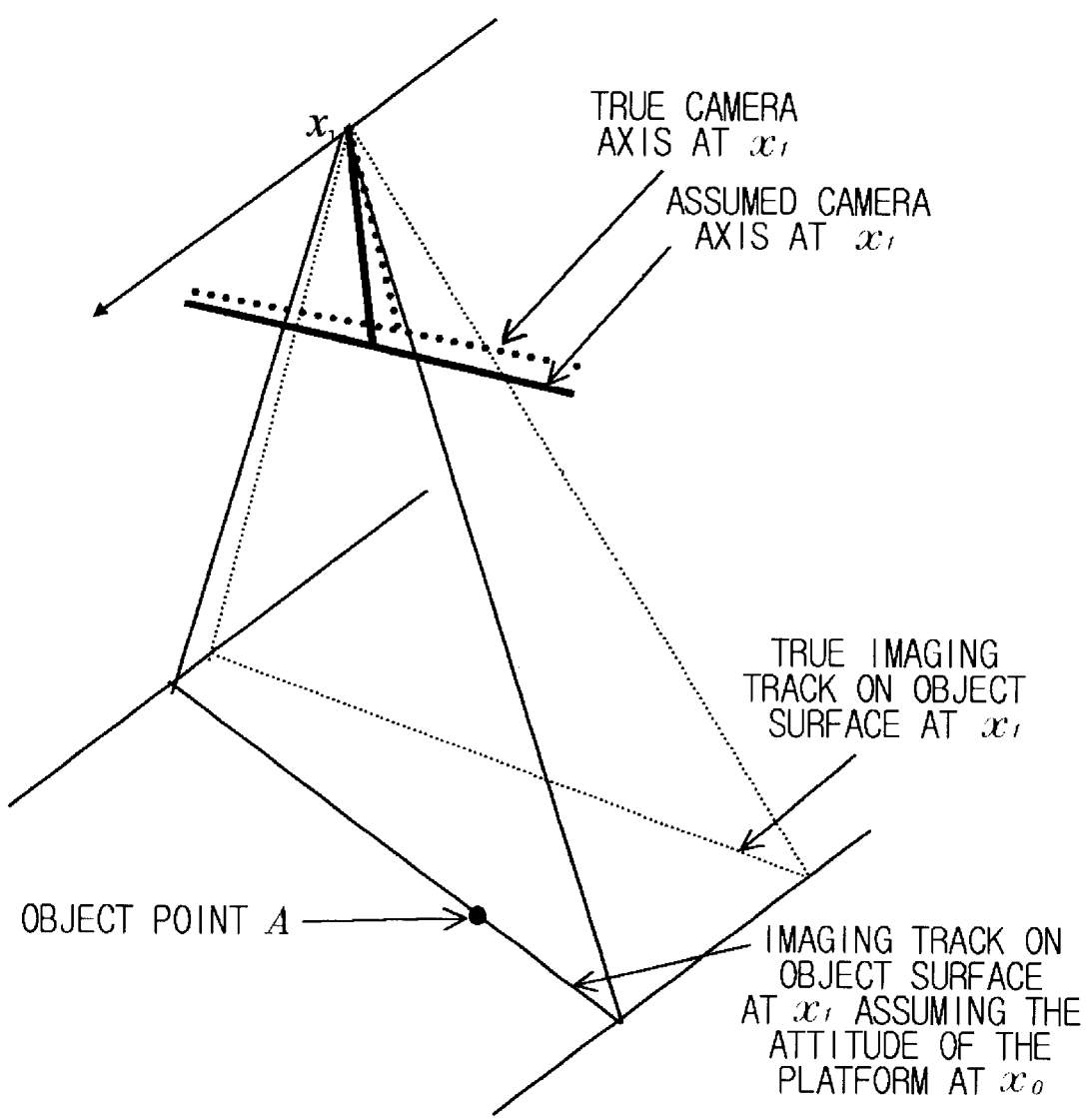

The principle of the algorithm of the presented invention can be explained with FIG. 2 and FIG. 3.

FIG. 2 shows a flight path of the platform (or sensor), imaging tracks on object surface at a given position and an object point A. At the steps S12 and S13, the attitude of the platform and the elements of the rotation matrix are calculated after assuming an initial value $x_0$. This corresponds to defining camera (or sensor) axis at $x_0$ as shown in the figure. Imaging track at $x_0$ does not contain the object point A since $x_0$ is not the right solution to be sought for.

At the step S14, the elements of the rotation matrix are considered as the constant, respectively, and the coordinate $x_1$ is found by solving the simplified Equation 4. This corresponds to assuming that the attitude of the platform at $x_0$ applies throughout the flight path and shifting the position of the platform so that imaging track on object surface contains the object point A.

However, as FIG. 3 illustrates, the true attitude of the platform at $x_1$ is different from the attitude at $x_0$, and the true imaging track at $x_1$ does not contain the object point A. At the step S15 through S16, the initial value is updated with $x_1$, and the step S12 is continued. This corresponds to updating the attitude of the platform at $x_1$ with the true attitude and iterating the procedures in FIG. 2 until imaging track on object surface at $x_1$ assuming the attitude at $x_0$ and the true imaging track at $x_1$ converge and both contain the object point A.

The theme of the present invention is the decomposition of the problem of transforming 3D object point onto 2D image point for linear pushbroom image into the problem of solving a simplified equation assuming the attitude of the platform is constant. The present invention works independent of the choice of initial value and converges to the right solution fast.

The above explanation elaborates the principle of the present invention with some examples. However, the above explanation does not confine the scope of the present invention and any variations or derivations from the above explanation should be included in the scope of the present invention.

According to the present invention, 3D object coordinates can be mapped directly onto 2D image coordinates for linear pushbroom images. This enables faster rectification of linear pushbroom images and improves the accuracy. Also the present invention enables the fast and accurate extraction of 3D information from linear pushbroom images.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transforming an object point in a 3D coordinate system into an image point on a linear pushbroom image captured by a linear pushbroom sensor and represented in a 2D coordinate system, comprising steps for:

setting collinearity equations in relation with the object point and the image point for the linear pushbroom image;

assuming an initial coordinate on a first coordinate axis in the 2D coordinate system and calculating the attitude of the linear pushbroom sensor using the initial coordinate;

obtaining a temporary coordinate by solving the collinearity equation, while assuming that the linear pushbroom sensor keeps a constant attitude as calculated;

calculating a differential between the initial coordinate and the temporary coordinate and comparing the differential with a given threshold;

repeating the attitude calculation step through the differential comparison step after considering the temporary coordinate as the initial coordinate if the differential exceeds the given threshold;

deciding on the temporary coordinate to be a final coordinate on the first coordinate axis if the differential does not exceed the given threshold; and obtaining a coordinate on a second coordinate axis in the 2D coordinate system by solving the collinearity equations using the final coordinate on the first coordinate axis.

2. The method according to claim 1, wherein the collinearity equations are set on, as follows;

$$0 = -f \frac{r_{11}(X - X_S) + r_{21}(Y - Y_S) + r_{31}(Z - Z_S)}{r_{13}(X - X_S) + r_{23}(Y - Y_S) + r_{33}(Z - Z_S)}$$

$$y = -f \frac{r_{12}(X - X_S) + r_{22}(Y - Y_S) + r_{32}(Z - Z_S)}{r_{13}(X - X_S) + r_{23}(Y - Y_S) + r_{33}(Z - Z_S)}$$

in which, X, Y and Z mean a coordinate of an object point, respectively; $X_S$, $Y_S$ and $Z_S$ mean a coordinate of the sensor upon capturing an image of the object, respectively; $r_{11}$, through $r_{33}$ mean an element of a rotation matrix R determined by the sensor attitude upon capturing an image of the object, respectively; $f$ means the focal length of the camera; and x and y mean a coordinate of an image point, respectively.

3. The method according to claim 2, wherein the temporary coordinate obtainment step comprises sub-steps for:

calculating elements of the rotation matrix R using the attitude of the linear pushbroom sensor; and solving the collinearity equation using the elements of the rotation matrix R.

4. A machine-readable medium on which a program is recorded, wherein the program conducts to transform an object point in a 3D coordinate system into an image point on a linear pushbroom image captured by a linear pushbroom sensor and represented in a 2D coordinate system by taking steps for:

setting collinearity equations in relation with the object point and the image point for the linear pushbroom image;

assuming an initial coordinate on a first coordinate axis in the 2D coordinate system and calculating the attitude of the linear pushbroom sensor using the initial coordinate;

obtaining a temporary coordinate by solving the collinearity equation, while assuming that the linear pushbroom sensor keeps a constant attitude as calculated;

calculating a differential between the initial coordinate and the temporary coordinate and comparing the differential with a given threshold;

repeating the attitude calculation step through the differential comparison step after considering the temporary coordinate as the initial coordinate if the differential exceeds the given threshold;

deciding on the temporary coordinate to be a final coordinate on the first coordinate axis if the differential does not exceed the given threshold; and obtaining a coordinate on a second coordinate axis in the 2D coordinate system by solving the collinearity equations using the final coordinate on the first coordinate axis.

* * * * *